United States Patent
Hu et al.

(10) Patent No.: US 11,836,470 B2
(45) Date of Patent: *Dec. 5, 2023

(54) ADAPTIVE QUANTUM CIRCUIT CONSTRUCTION FOR MULTIPLE-CONTROLLED-NOT GATES

(71) Applicant: International Business Machines Corporation, Armonk, NY (US)

(72) Inventors: Shaohan Hu, Yorktown Heights, NY (US); Rudy Raymond Harry Putra, Yokohama (JP); Stephen Wood, Thornwood, NY (US); Marco Pistoia, Amawalk, NY (US); Jay M. Gambetta, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,108

(22) Filed: Jan. 12, 2023

(65) Prior Publication Data

US 2023/0142419 A1    May 11, 2023

Related U.S. Application Data

(63) Continuation of application No. 16/224,912, filed on Dec. 19, 2018, now Pat. No. 11,609,751.

(51) Int. Cl.
*G06F 11/00* (2006.01)
*G06F 8/41* (2018.01)
*G06N 10/20* (2022.01)
*G06N 10/40* (2022.01)

(52) U.S. Cl.
CPC .............. *G06F 8/41* (2013.01); *G06N 10/20* (2022.01); *G06N 10/40* (2022.01)

(58) Field of Classification Search
CPC .......... G06F 8/41; G06N 10/20; G06N 10/40
See application file for complete search history.

(56) References Cited

U.S. PATENT DOCUMENTS 11,609,751 B2 * 3/2023 Hu ........................ G06N 10/40

OTHER PUBLICATIONS

List of all IBM related dockets, 2023.

* cited by examiner

*Primary Examiner* — Samir W Rizk
(74) *Attorney, Agent, or Firm* — Garg Law Firm, PLLC; Rakesh Garg; Erik Johnson (57) ABSTRACT

In an embodiment, a method includes measuring a first number of control qubits in a quantum algorithm, wherein a quantum circuit representation of the quantum algorithm includes a multiple-controlled-NOT gate. In an embodiment, a method includes measuring a second number of ancilla qubits in a quantum computer. In an embodiment, a method includes comparing the first number and the second number to determine an optimum compilation method for a quantum circuit. In an embodiment, a method includes compiling, in response to the comparison determining the second number is greater than one and less than the difference of the first number and 2, a quantum circuit from the quantum algorithm using a hybrid method.

20 Claims, 5 Drawing Sheets

ADAPTIVE QUANTUM CIRCUIT CONSTRUCTION FOR MULTIPLE-CONTROLLED-NOT GATES

TECHNICAL FIELD

The present invention relates generally to quantum circuit construction. More particularly, the present invention relates to an adaptive quantum circuit construction for multiple-controlled-NOT gates.

BACKGROUND

Hereinafter, a "Q" prefix in a word of phrase is indicative of a reference of that word or phrase in a quantum computing context unless expressly distinguished where used.

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 at the same time. Entanglement means that qubits in a superposition can be correlated with each other in a non-classical way; that is, the state of one (whether it is a 1 or a 0 or both) can depend on the state of another, and that there is more information that can be ascertained about the two qubits when they are entangled than when they are treated individually.

Using these two principles, qubits operate as more sophisticated processors of information, enabling quantum computers to function in ways that allow them to solve difficult problems that are intractable using conventional computers. IBM has successfully constructed and demonstrated the operability of a quantum processor using superconducting qubits (IBM is a registered trademark of International Business Machines corporation in the United States and in other countries.)

Quantum algorithms apply quantum operations (quantum gates) on subsets of qubits. Quantum gates are analogous to instructions in a classical computing program. A quantum circuit is a representation of a quantum algorithm using quantum gates. The illustrative embodiments recognize that presently available quantum computing models require quantum algorithms to be specified as quantum circuits on idealized hardware, instead of an actual quantum computer.

The illustrative embodiments further recognize that quantum algorithms require mapping into a representation that an actual quantum computer can execute, through a process known as quantum circuit compilation. The illustrative embodiments recognize that compilation often requires adding additional gates to move qubit states to locations where a desired gate acts upon the qubit state due to the physical constraints of the actual quantum computer. An ancilla qubit is a helper qubit on the actual quantum hardware which is not involved with the input or output of the compiled quantum circuit but assists in the execution of the quantum circuit.

The illustrative embodiments recognize that quantum processors can perform algorithms which conventional processors are incapable of performing efficiently. A controlled-NOT gate is a quantum logic gate acting on two qubits, a control qubit and a target qubit. A Toffoli gate or controlled-controlled-NOT gate is a quantum logic gate acting on three qubits, two control qubits and a target qubit. A multiple-controlled-NOT gate is a quantum logic gate acting on a set of qubits, the set of qubits including a target qubit and the remainder of the set of qubits being control qubits. The illustrative embodiments recognize that presently available circuit construction methods do not take into account the requirements of the quantum computing hardware One basic implementation method for compiling a quantum circuit with multiple-controlled-NOT gates includes chaining controlled-controlled-NOT gates in a V-shape. The basic implementation method requires a number of ancilla qubits which increases linearly with the number of control qubits. For example, the number of ancilla qubits must be greater than or equal to the number of control qubits minus two. The basic implementation method results in a shallow quantum circuit depth. The circuit depth is the maximum length of a directed path from the input to the output of the quantum circuit. Another implementation method for compiling a quantum circuit with multiple-controlled-NOT gates requires at most one ancilla qubit but results in a quantum circuit with greater depth than the basic implementation method. This advanced implementation method includes storing a result of recursively using a multiple-controlled-NOT gate with zero to four control qubits and storing the result of the multiple-controlled-NOT gate with a single ancillary qubit.

SUMMARY

The illustrative embodiments provide a method, system, and computer program product for adaptive quantum circuit construction for multiple-controlled-NOT gates. In an embodiment, a method includes measuring a first number of control qubits in a quantum algorithm, wherein a quantum circuit representation of the quantum algorithm includes a multiple-controlled-NOT gate. In an embodiment, a method includes measuring a second number of ancilla qubits in a quantum computer. In an embodiment, a method includes comparing the first number and the second number to determine an optimum compilation method for a quantum circuit. In an embodiment, a method includes compiling, in response to the comparison determining the second number is greater than one and less than the difference of the first number and 2, a quantum circuit from the quantum algorithm using a hybrid method.

In an embodiment, the hybrid method includes a basic method and an advanced method. In an embodiment, a method includes determining a difference between the first number of control qubits and the second number of ancilla qubits. In an embodiment, a method includes controlling, in response to the difference being less than five, a first subset of the number of control qubits with the basic method and a second subset of the number of control qubits with the advanced method.

In an embodiment, a method includes controlling, in response to the difference being less than or equal to four, a first subset of the number of control qubits with the advanced method. In an embodiment, a method includes writing a result of the first subset of the number of control qubits to an ancilla qubit. In an embodiment, a method includes controlling a second subset of the number of control qubits and the ancilla qubit with the basic method.

An embodiment includes a computer usable program product. The computer usable program product includes a computer-readable storage device, and program instructions stored on the storage device.

In an embodiment, the program instructions are stored in a computer readable storage device in a data processing system, and wherein the computer usable code is transferred over a network from a remote data processing system. In an embodiment, the program instructions are stored in a computer readable storage device in a server data processing system, and wherein the computer usable code is downloaded over a network to a remote data processing system for use in a computer readable storage device associated with the remote data processing system.

An embodiment includes a computer system. The computer system includes a quantum processor, a computer-readable memory, and a computer-readable storage device, and program instructions stored on the storage device for execution by the quantum processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments used to describe the invention generally address and solve the above-described problem of quantum circuit compilation. The illustrative embodiments provide a method adaptive quantum circuit construction for multiple-controlled-NOT gates.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for automatic quantum searching of object databases using a variety of components that can be purposed or repurposed to provide a described function within a data processing environment, and such adaptations are contemplated within the scope of the illustrative embodiments.

The illustrative embodiments are described with respect to certain types of steps, applications, quantum logic gates, and data processing environments only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
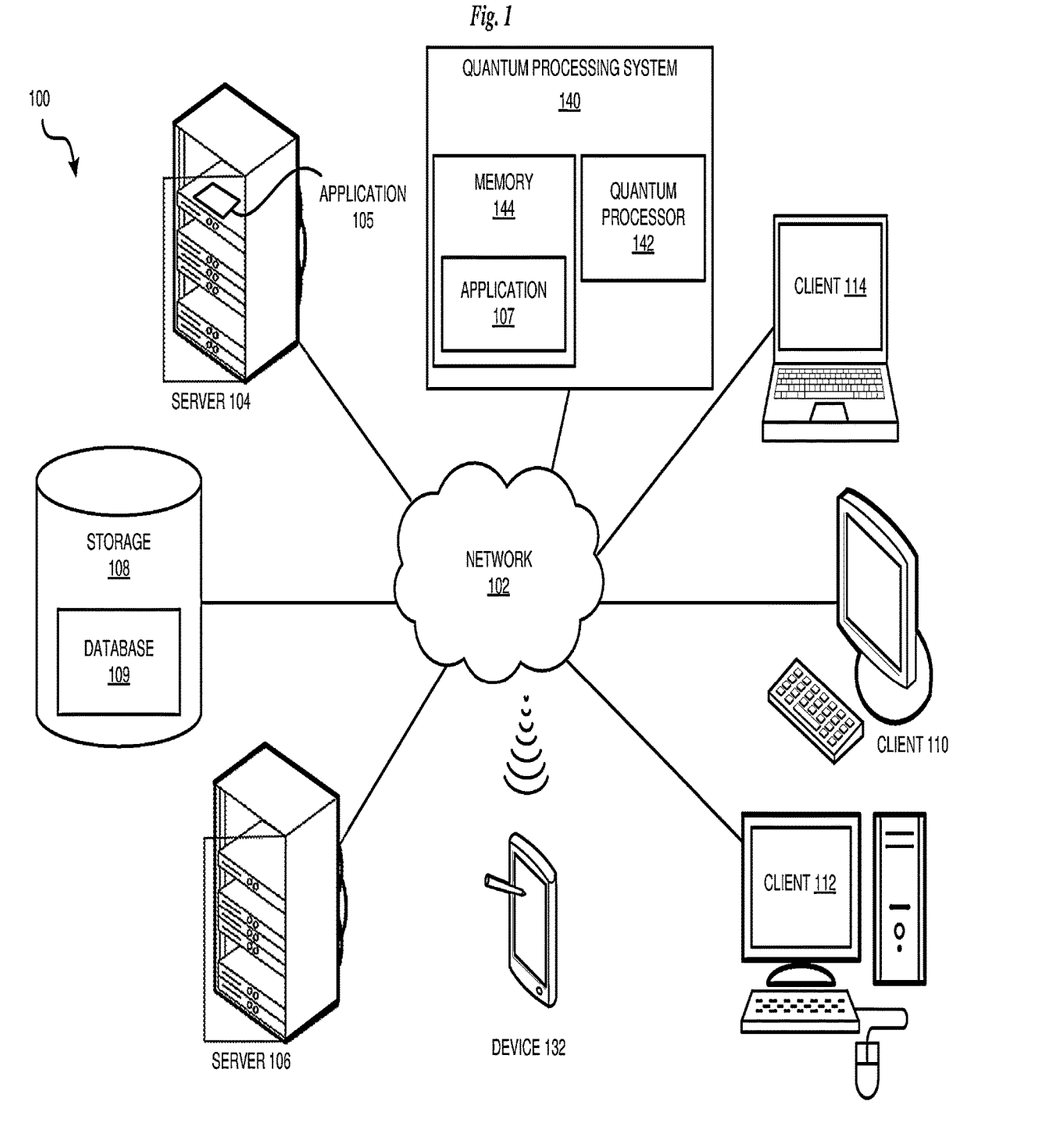
FIG. 1 depicts a block diagram of a network of data processing systems in which illustrative embodiments may be implemented.
Figure 2:
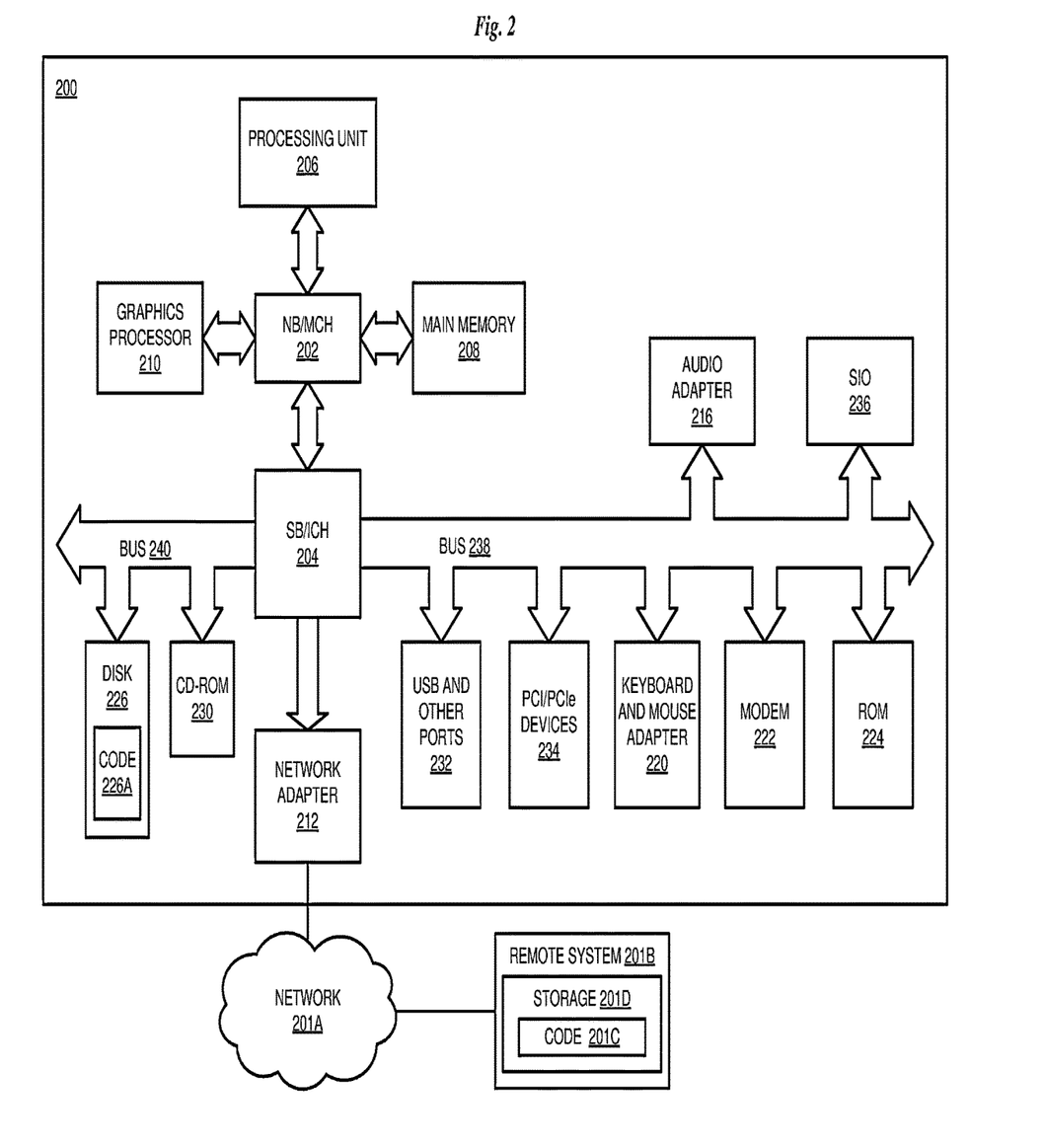
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 couples to network 102 along with storage unit 108. Server 104 is a conventional data processing system. Quantum processing system 140 couples to network 102. Quantum processing system 140 is a quantum data processing system. Software applications may execute on any quantum data processing system in data processing environment 100. Any software application described as executing in quantum processing system 140 in FIG. 1 can be configured to execute in another quantum data processing system in a similar manner. Any data or information stored or produced in quantum processing system 140 in FIG. 1 can be configured to be stored or produced in another quantum data processing system in a similar manner. A quantum data processing system, such as quantum processing system 140, may contain data and may have software applications or software tools executing quantum computing processes thereon.

Clients 110, 112, and 114 are also coupled to network 102. A conventional data processing system, such as server 104, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 104, and clients 110, 112, 114, are depicted as servers and clients only as example and not to imply a limitation to a client-server architecture. As another example, an embodiment can be distributed across several conventional data processing systems, quantum data processing systems, and a data network as shown, whereas another embodiment can be implemented on a single conventional data processing system or single quantum data processing system within the scope of the illustrative embodiments. Conventional data processing systems 104, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 104, storage unit 108, quantum processing system 140, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, memory 144 may provide data, such as boot files, operating system images, and applications to quantum processor 142. Quantum processor 142 may include its own data, boot files, operating system images, and applications. Data processing environment 100 may include additional memories, quantum processors, and other devices that are not shown. Memory 144 may include an application 107 that may be configured to implement one or more of the methods described herein in accordance with one or more embodiments. Server 104 includes application 105 that may be configured to implement one or more of the methods described herein in accordance with one or more embodiments.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as servers 104 and 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
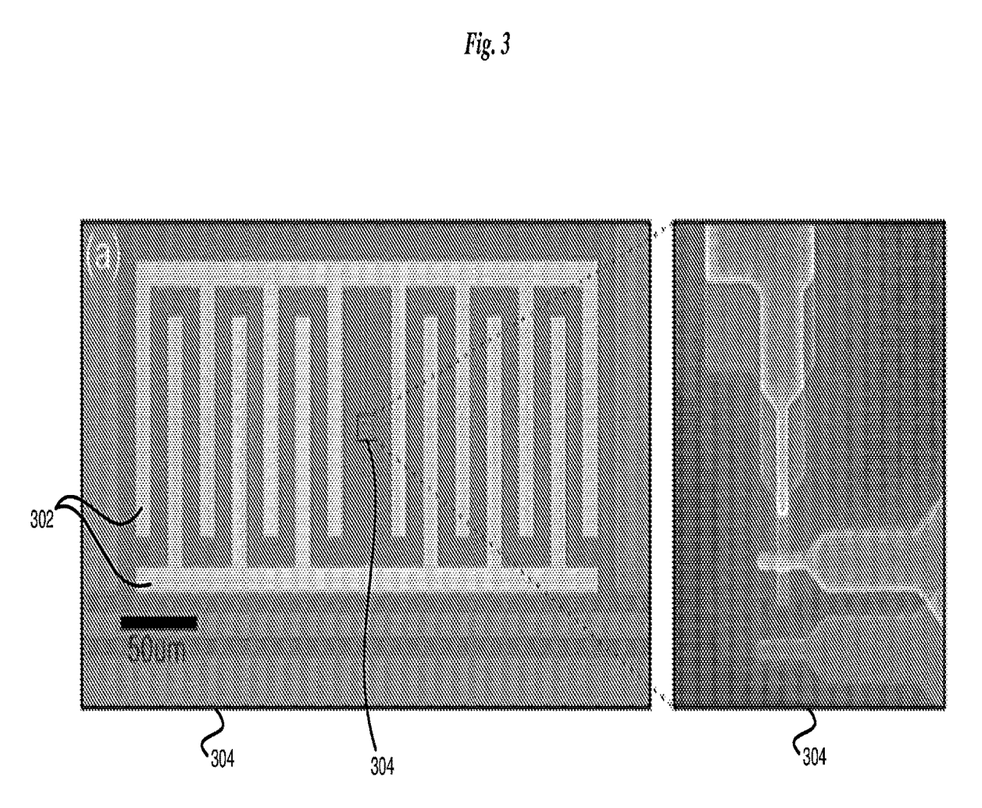
FIG. 3 depicts a qubit, in accordance with an illustrative embodiment.

With reference to FIG. 3, this figure depicts a qubit for use in a quantum processor (e.g., quantum processor 142 in FIG. 1). Qubit 300 includes capacitor structure 302 and Josephson junction 304. Josephson junction 304 is formed by separating two thin-film superconducting metal layers by a non-superconducting material. When the metal in the superconducting layers is caused to become superconducting—e.g. by reducing the temperature of the metal to a specified cryogenic temperature—pairs of electrons can tunnel from one superconducting layer through the non-superconducting layer to the other superconducting layer. In the superconducting qubit 300, the Josephson junction 304—which has a small inductance—is electrically coupled in parallel to capacitor structure 302, forming a nonlinear resonator.

Figure 4:
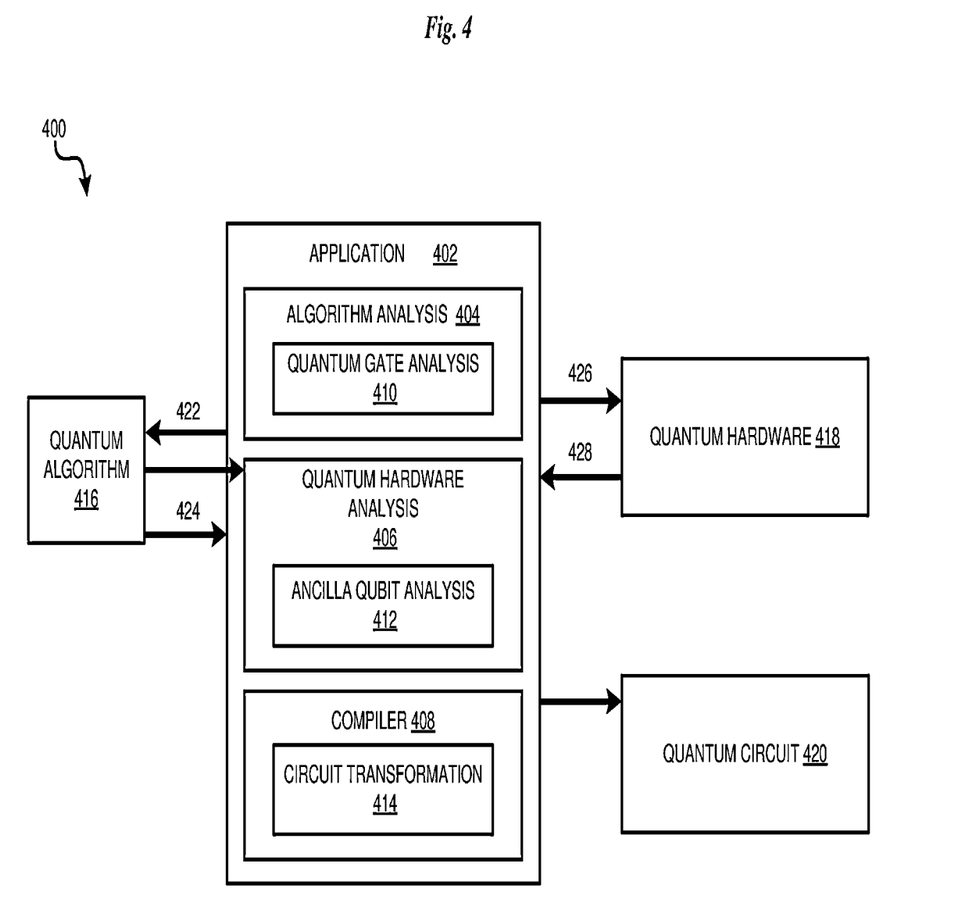
FIG. 4 depicts a block diagram of an example configuration 300 for adaptive quantum circuit construction for multiple-controlled-NOT gates in accordance with an illustrative embodiment.

With reference to FIG. 4, this figure depicts a block diagram of an example configuration 400 for adaptive quantum circuit construction for multiple-controlled-NOT gates in accordance with an illustrative embodiment. The example embodiment includes an application 402. In a particular embodiment, application 402 is an example of applications 105, 107 of FIG. 1.

Application 402 receives a quantum algorithm 416. In an embodiment, application 402 compiles quantum algorithm 416 for execution on quantum hardware 418, such as a quantum processor. Application 402 includes a circuit analysis component 404, a quantum hardware analysis component 406, and a compiler component 408.

Algorithm analysis component 404 includes a quantum gate analysis component 410. In an embodiment, quantum gate analysis component 410 determines a number of controlled-NOT gates in quantum algorithm 416. For example, quantum gate analysis component 410 can execute an analysis pass 422 of the quantum algorithm 416 to return information 424 about the number of controlled-NOT gates. In an embodiment, quantum gate analysis component 410 determines a number of control qubits required in a corresponding quantum circuit of the quantum algorithm 416.

Quantum hardware analysis component 406 includes ancilla qubit analysis component 412. Ancilla qubit analysis component 412 determines a number of ancilla qubits available on the quantum hardware 418. For example, ancilla qubit analysis component 412 can execute an analysis pass 426 on the quantum hardware 418 to return information 428 about the number of ancilla qubits.

Compiler component 408 compiles a corresponding quantum circuit 420 for the quantum algorithm 416 to execute on the quantum hardware 418. Compiler component 408 includes circuit transformation component 414. Circuit transformation component 414 can compare the number of control qubits required in the quantum circuit 420 and the number of ancilla qubits in the quantum hardware 418 to determine an optimum compilation method for the quantum circuit. In an embodiment, if the number of ancilla qubits is greater than or equal to the difference between the number of control qubits and two, component 414 compiles the circuit with a basic method, chaining controlled controlled-NOT gates in a V-shape. In an embodiment, if the number of ancilla qubits is less than or equal to one, component 414 compiles the circuit with an advanced method.

In an embodiment, if the number of ancilla qubits is greater than 1 and less than the number of control qubits minus two, component 414 compiles the quantum circuit with a hybrid method. The advanced method handles a first subset of the number of control qubits. If the difference between the number of control qubits and the number of ancilla qubits is less than five, then the advanced method requires no ancilla qubits. If the difference between the number of control qubits and the number of ancilla qubits is less than or equal to four, then the advanced method requires a single ancilla qubit. The basic method handles a second subset of the number of control qubits and any ancilla qubit required by the advanced method. The advanced method writes a result of the first subset of control qubits to a required ancilla qubit.

In an embodiment, compiler component 408 performs an analysis pass to measure a set of qubit parameters and a set of gate parameters of the quantum hardware 418. For example, component 408 can determine coherence times and error rates for a set of qubits of the quantum hardware. As another example, component 408 can determine available single qubit rotation gates on the quantum hardware. In an embodiment, component 408 compiles the corresponding quantum circuit from the quantum algorithm while taking into account the set of qubit parameters and the set of gate parameters. For example, component 408 can examine the set of qubit parameters and the set of gate parameters and use a machine learning method to determine an optimal parameter of the set of qubit parameters and the set of gate parameters to compile the multiple-controlled-NOT gates.

Figure 5:
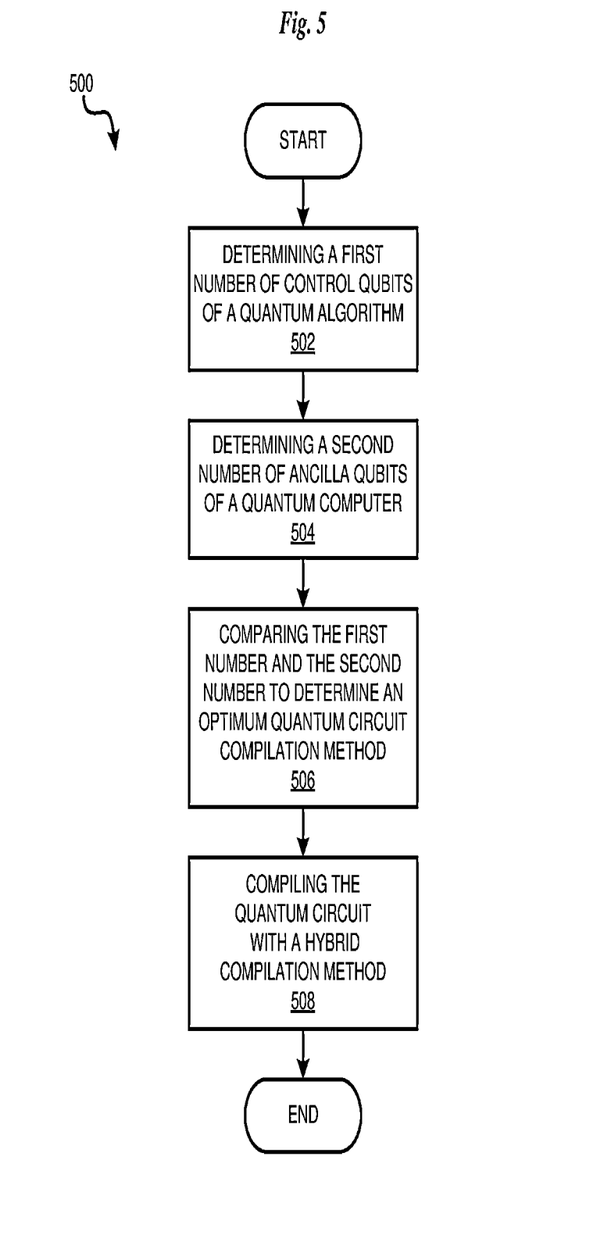
FIG. 5 depicts a flowchart of an example method for adaptive quantum circuit construction for multiple-controlled-NOT gates in accordance with an illustrative embodiment.

With reference to FIG. 5, this figure depicts a flowchart of an example method for adaptive quantum circuit construction for multiple-controlled-NOT gates in accordance with an illustrative embodiment. Example process 500 may be performed by application 402 in FIG. 4. In block 502, application 402 determines a first number of a set of control qubits of a quantum algorithm. In block 504, application 402 determines a second number of ancilla qubits of a quantum hardware, such as a quantum computer. In block 506, application 402 compares the first number and the second number to determine an optimum quantum circuit compilation method. In block 508, application 402 compiles the quantum circuit for the quantum algorithm. In an embodiment, if the number of ancilla qubits is greater than or equal to the difference between the number of control qubits and two, application 402 compiles the circuit with a basic method, chaining controlled-controlled-NOT gates in a V-shape. In an embodiment, if the number of ancilla qubits is less than or equal to one, application 402 compiles the circuit with an advanced method. In an embodiment, if the number of ancilla qubits is greater than 1 and less than the number of control qubits minus two, application 402 compiles the quantum circuit with a hybrid method including the basic method and the advanced method.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
comparing a first number of control qubits in a quantum algorithm with a second number of ancilla qubits in a quantum computer, wherein a quantum circuit representation of the quantum algorithm includes a multiple-controlled-NOT gate;
determining, based on the comparing, an optimum compilation method for the quantum circuit; and
compiling, responsive to a determination from the comparing that the second number is greater than one and less than a difference of the first number and 2, the quantum circuit from the quantum algorithm using a hybrid method.

2. The method of claim 1, wherein the hybrid method includes a basic method and an advanced method.

3. The method of claim 2, further comprising:
determining a difference between the first number of control qubits and the second number of ancilla qubits.

4. The method of claim 3, further comprising:
controlling, in response to the difference being less than five, a first subset of the number of control qubits with the basic method and a second subset of the number of control qubits with the advanced method.

5. The method of claim 3, further comprising:
controlling, in response to the difference being less than or equal to four, a first subset of the number of control qubits with the advanced method.

6. The method of claim 5, further comprising:
writing a result of the first subset of the number of control qubits to an ancilla qubit.

7. The method of claim 6, further comprising:
controlling a second subset of the number of control qubits and the ancilla qubit with the basic method.

8. A computer usable program product comprising a computer-readable storage medium, and program instructions stored on the storage medium, the stored program instructions comprising:
program instructions to compare a first number of control qubits in a quantum algorithm with a second number of ancilla qubits in a quantum computer, wherein a quantum circuit representation of the quantum algorithm includes a multiple-controlled-NOT gate;
program instructions to determine, based on the program instructions to compare, an optimum compilation method for the quantum circuit; and
program instructions to compile, responsive to a determination from the program instructions to compare that the second number is greater than one and less than a difference of the first number and 2, the quantum circuit from the quantum algorithm using a hybrid method.

9. The computer usable program product of claim 8, wherein the program instructions are stored in a computer readable storage medium in a data processing system, and wherein the computer usable code is transferred over a network from a remote data processing system.

10. The computer usable program product of claim 8, wherein the program instructions are stored in a computer readable storage medium in a server data processing system, and wherein the computer usable code is downloaded over a network to a remote data processing system for use in a computer readable storage medium associated with the remote data processing system.

11. The computer usable program product of claim 8, wherein the hybrid method includes a basic method and an advanced method.

12. The computer usable program product of claim 11, the stored program instructions further comprising:
program instructions to determine a difference between the first number of control qubits and the second number of ancilla qubits.

13. The computer usable program product of claim 12, the stored program instructions further comprising:
program instructions to control, in response to the difference being less than five, a first subset of the number of control qubits with the basic method and a second subset of the number of control qubits with the advanced method.

14. The computer usable program product of claim 12, the stored program instructions further comprising:
program instructions to control, in response to the difference being less than or equal to four, a first subset of the number of control qubits with the advanced method.

15. The computer usable program product of claim 14, the stored program instructions further comprising:
program instructions to write a result of the first subset of the number of control qubits to an ancilla qubit.

16. The computer usable program product of claim 15, the stored program instructions further comprising:
program instructions to control a second subset of the number of control qubits and the ancilla qubit with the basic method.

17. A computer system comprising a quantum processor, a computer-readable memory, and a computer-readable storage medium, and program instructions stored on the storage device for execution by a processor via the memory, the stored program instructions comprising:
- program instructions to compare a first number of control qubits in a quantum algorithm with a second number of ancilla qubits in a quantum computer, wherein a quantum circuit representation of the quantum algorithm includes a multiple-controlled-NOT gate;
- program instructions to determine, based on the program instructions to compare, an optimum compilation method for the quantum circuit; and
- program instructions to compile, responsive to a determination from the program instructions to compare that the second number is greater than one and less than a difference of the first number and 2, the quantum circuit from the quantum algorithm using a hybrid method.

18. The computer system of claim 17, wherein the hybrid method includes a basic method and an advanced method.

19. The computer system of claim 18, the stored program instructions further comprising:
- program instructions to determine a difference between the first number of control qubits and the second number of ancilla qubits.

20. The computer system of claim 19, the stored program instructions further comprising:
- program instructions to control, in response to the difference being less than five, a first subset of the number of control qubits with the basic method and a second subset of the number of control qubits with the advanced method.

* * * * *